Sept. 16, 1924.

E. R. CARICHOFF

ELECTRIC ARC WELDING

Filed Dec. 14, 1923

Inventor:
Eugene R. Carichoff,
by
His Attorney.

Sept. 16, 1924.

E. R. CARICHOFF

ELECTRIC ARC WELDING

Filed Dec. 14, 1923

Inventor:
Eugene R. Carichoff,
by
His Attorney.

Patented Sept. 16, 1924.

1,508,742

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

ELECTRIC-ARC WELDING.

Application filed December 14, 1923. Serial No. 680,728.

*To all whom it may concern:*

Be it known that I, EUGENE R. CARICHOFF, a citizen of the United States, residing at Schenectady, in the county of Schenectady, State of New York, have invented certain new and useful Improvements in Electric-Arc Welding, of which the following is a specification.

My invention relates to electric arc welding of the type wherein the welding arc is maintained between the work constituting one electrode and a welding pencil constituting the other electrode, a suitable source of welding current being provided connected to the electrodes during welding.

An object of my invention is to provide improved circuit controlling mechanism arranged to control the striking of the arc automatically and an arrangement of apparatus and method of operation for facilitating the striking of the arc automatically.

While my invention is more particularly designed for welding systems in which the arc is maintained between a metallic electrode and the work, certain features of the control mechanism are applicable to systems in which a carbon or other non-metallic electrode is used.

My invention will be better understood from the following description taken in connection with the accompanying drawings, and its scope will be pointed out in the appended claims.

In the accompanying drawings.

Figure 1:
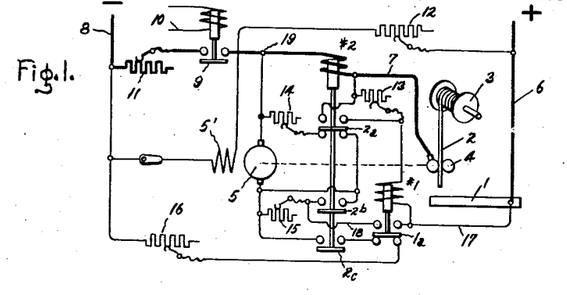
Fig. 1 is a diagrammatic representation of a welding system embodying my control mechanism.

Referring to Fig. 1, the welding arc is struck and maintained between the work 1 and a metallic pencil or electrode 2 which is represented as drawn from a reel 3. The electrode 2 is represented as fed by feed rolls 4 driven in any suitable manner by an electric motor 5. The work 1 is represented as connected by a conductor 6 to the positive side of a suitable source of welding current. The electrode 2 is represented as connected to the negative side of the source through conductors 7 and 8. A switch 9 is arranged to complete the circuit from the source to the electrodes and this switch may be operated in any desired manner, for example by a coil 10 which may be remotely controlled, as is well known in the art. An adjustable resistor 11 is shown for adjusting the welding current to any desired value as is common in the art where the source of welding current has a substantially constant voltage. At the outset it will be understood by those skilled in the art that a constant voltage source and series resistor represents merely one well known type of welding circuit and that any well known system producing similar current voltage characteristics in the welding circuit may be used. The field winding 5′ of the electrode feed motor is represented as supplied from the constant voltage mains 6 and 8 through a resistance 12 which may be adjusted to any desired value.

The direction of operation of the electrode feed motor 5 is controlled by a shunt contactor #1 and a series contactor #2. The operating coil or winding of the shunt contactor #1 is connected across the electrodes through a resistor 13. This contactor is provided with a contact 1ª which makes one circuit when the contactor is deenergized and another circuit when the contactor is energized. The operating coil or winding of the contactor #2 is in series with the electrodes. This contactor is provided with three contacts 2ª, 2ᵇ and 2ᶜ. When contactor #2 is deenergized contact 2ª completes a shunt around the armature of the motor 5 through a resistor 14. When contactor #2 is energized contact 2ª completes a circuit cutting out the resistor 13 by establishing a shunt about the resistor. Contacts 2ᵇ and 2ᶜ are closed when the contactor is energized, contact 2ᵇ cutting out a resistor 15 when closed and contact 2ᶜ cooperating with contact 1ª, when contactor #1 is deenergized, to close a back or reversing circuit for the motor armature through resistor 16, The operation of the arrangement shown in Fig. 1 is as follows: Assuming that the electrode 2 is separated from the work, when the switch 9 is closed contactor #2 remains deenergized. Contactor #1 is energized through the resistor 13 which protects the winding of the contactor from the high voltage across the electrodes which is equal to the open circuit voltage of the source, that is, the voltage which the source gives when it is not supplying current through the welding electrodes. Contactor #1 therefore picks up and contactor #2 remains down. A circuit for operating the motor 5 in a direction to feed the electrode toward the work is completed through the lead 17, contact 1ª, lead 18, resistor 15, the armature of the motor and switch 9 to the source. The current through the motor armature is limited by the resistor 15 and the resistor 14 in shunt with the motor armature causes the motor to run at a slow and steady speed to feed the welding electrode toward and into contact with the work.

When the welding electrode engages the work, contactor #2 picks up, being energized by the current flowing from the source through the electrodes and resistor 11. Contactor #1 drops out, being deenergized by reason of the shunt established around its operating coil upon the engagement of the electrodes. A circuit for operating the electrode feed motor in the reverse direction is now completed, this circuit leading from point 19 through the motor armature, contact 2ᶜ, contact 1ª and resistor 16 to the line 8. It will be observed that point 19 is at substantially the same voltage as the positive main 6 when the electrodes are in engagement and the circuit therefore for simplicity has been traced from point 19. Contactor #2 being a series contactor, may be made to operate very quickly. At the instant that the electrode 2 engaged the work and before the contactor #2 picked up, the resistor 14 was in shunt to the motor armature and the motor armature was also shunted by the electrodes through the resistor 15. Operating voltage was therefore removed from the motor armature and a dynamic braking action was present tending to stop the motor, the motor field being energized. The picking up of contactor #2 opened the shunt resistor 14 but at the same time shunted the resistor 15 so that prior to the dropping out of contactor #1 a low resistance dynamic-braking circuit was maintained around the motor armature through the electrodes. Therefore, during the entire small interval of time taken for the picking up of contactor #2 and the dropping out of contactor #1 a dynamic braking action took place to stop the motor and, since the motor was operating slowly and steadily to feed the electrode toward the work until contact was made between the electrode and the work, there was no tendency to jam the electrode against the work even though the electrode feed rolls 4 gripped the electrodes tightly.

As has just been shown, the energization of contactor #2 and the deenergization of contactor #1 completes a circuit to reverse the motor to withdraw the electrode from the work and strike the arc. The voltage across the arc varies sensitively with the arc length and upon a predetermined arc voltage contactor #1, which is now directly across the arc, resistor 13 being short circuited, picks up and the motor armature is connected across the arc through lead 17, contact 1ª, lead 18, contact 2ᵇ, the motor armature, to point 19, which is at the same potential as the electrode 2, the series coil of contactor #2 being of low resistance. The motor now again reverses and feeds the electrode toward the work to maintain the arc. Any tendency of the arc to lengthen increases the voltage applied to the armature of the feed motor and increases the rate at which the electrode is fed to restore the arc length, and any tendency of the arc to shorten slows down the feed motor, so that the arc length is maintained substantially constant.

If during welding the electrode 2 contacts with the work by reason, for example, of some abrupt variation in the contour of the work, contactor #1 will be deenergized and the back circuit through the resistor 16 will be completed for immediately reversing the direction of operation of the motor to restrike the arc. If at any time during welding the arc is interrupted at the electrodes, contactor #2 is deenergized but the motor still operates to feed the electrode toward the work to reestablish the arc since contactor #1 remains energized and the motor circuit is completed through the lead 17, contact 1ª, lead 18 and resistor 15 to the point 19. Resistor 13 is inserted in circuit with the winding of contactor #1 and resistor 15 is inserted in series with the motor armatures so that contactor #1 and motor 5 are protected from the relatively high voltage which exists across the electrodes when the arc is broken.

The normal welding voltage of the arc will be adjusted for somewhere in between about 12 and 20 volts and the open circuit voltage of the source will ordinarily be from about 40 to 70 volts. Since the motor armature must respond sensitively to changes in the relatively low arc voltage and the contactor #1 must be adjusted to pick up on something less than 12 volts with the resistor 13 cut out, it is apparent that if the resistors 13 and 15 were not provided, the motor and the winding of contactor #1 might be injured because they would be subjected to the relatively high open circuit voltage of the source.

In the arrangement shown in Fig. 1 just described, the shunt contactor #1 picks up first and when the electrodes are in engagement, contactor #2 picks up and contactor #1 drops out, #1 picking up again when the arc has been established. My idea of means comprising circuit controlling means operated by windings, respectively in series and shunt with the electrodes to control the operation of an electrode feed motor in accordance with the condition at the arc, is however applicable, as will appear from the following description, to other arrangements of the series and shunt windings to secure the desired operation of the electrode feed motor.

Figure 2:
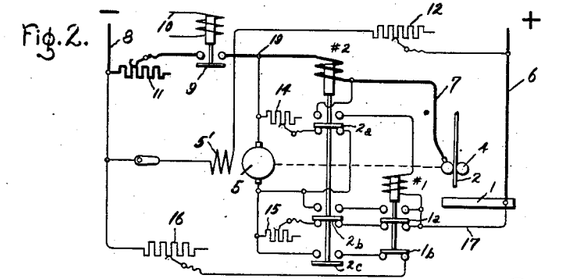
Fig. 2 is a diagram showing a modification.

Fig. 2 shows a modification of the arrangement shown in Fig. 1 in which the shunt contactor #1 does not pick up until after the series contactor #2 has picked up.

Referring to Fig. 2, the arrangement is the same as that shown in Fig. 1 except that contactor #1 remains down until contactor #2 picks up upon the engagement of the electrodes, contactor #1 picking up after the arc has been established. It will be observed that in the arrangement of Fig. 2 the resistor 13 of Fig. 1 is omitted from the operating coil of contactor #1 so that the circuit of this coil is not completed until contactor #2 picks up, at which time the circuit of the coil is completed by the contact 2ᵃ. Contact 2ᵃ controls the circuit of the shunt resistor 14 as in the arrangement of Fig. 1. Contactor #1 is provided with an additional contact 1ᵇ in the arrangement of Fig. 2, and the circuits made by the contacts 1ᵃ, 1ᵇ, 2ᵇ, and 2ᶜ are arranged so that when contactors #1 and #2 are both deenergized, a circuit is completed for operating the feed motor is completed for operating the motor in a direction to feed the electrode 2 into engagement with the work. When the electrodes are in engagement, contactor #2 becomes energized and contactor #1 remains deenergized completing a back or reversing circuit to operate the motor to withdraw the electrode to establish the arc. When the arc has been established contactor #1, as well as contactor #2, is energized and the motor armature is connected in shunt to the arc.

The operation of the arrangement shown in Fig. 2, when the switch 9 is closed and the circuit broken at the electrodes, is as follows: Both contactors #1 and #2 are deenergized. A circuit for operating the feed motor in a direction to cause engagement of the electrodes is completed through the lead 17, contact 1ᵃ, contact 2ᵇ, resistor 15, the armature of the motor to point 19. Upon engagement of the electrodes current flows through the winding of contact #2 which picks up. Contact 2ᵃ completes the circuit of the operating winding of contactor #1 but contactor #1 does not pick up because there is insufficient voltage drop across the electrodes to energize its operating winding sufficiently. A circuit for operating the motor in the reverse direction to withdraw the electrode from the work to strike the arc is now completed from point 19 through the motor armature, contact 2ᶜ, contact 1ᵇ and resistor 16. When the welding arc has been established, contactor #1 picks up and the armature of the electrode feed motor is connected in shunt to the arc through lead 17, contact 1ᵃ, contact 2ᵇ, the motor armature to point 19. The motor then operates to keep the arc length substantially constant as in the arrangement of Fig. 1.

Any interruption of the arc immediately deenergizes contactor #2, the contact 2ᵃ of which also deenergizes contactor #1. A circuit for continuing the operation of the motor in a direction to feed the electrode toward the work to reestablish the arc is, therefore, completed through lead 17 and contacts 1ᵃ and 2ᵇ and resistor 15 as heretofore described. If during welding the electrode contacts with the work, contactor #1 is deenergized and drops out but contactor #2 remains energized by reason of the current flowing through the circuit including the electrodes. The back circuit from point 19 through the motor armature, contact 2ᶜ, contact 1ᵇ and resistor 16 is, therefore, completed to reverse the motor and restrike the arc.

The arrangement shown in Fig. 2, wherein the circuit of contactor #1 is not completed until after the electrodes engage, during the arc striking operation, presents some advantages over the arrangement shown in Fig. 1 for the reason that the shunt contactor can be made to pick up more quickly than it can be readily made to drop out. The series contactor is very quick in its operation. In the arrangement of Fig. 2, the picking up of the series contactor immediately completes the circuit for reversing the motor and the tendency of the electrode to jam against the work is still further overcome. The arrangement of Fig. 2 avoids the necessity of providing a separate resistor 13. I do not claim specifically the arrangement shown in Fig. 2, this arrangement being specifically claimed in the copending application of Charles E. Glasser, Serial No. 639,196, filed May 15, 1923, for electric arc welding, and assigned to the same assignee as the present application.

It will be understood that I use the terms shunt and series contactors in a broad sense. Any suitable construction of electromagnetic or equivalent switching means may be used to make the desired circuit connections in the desired sequence in response to the electrical condition of the circuit through the electrodes in the manner set forth. It will also be understood that suitable means are contemplated for traversing the arc along the joint to be welded. Such traversing mechanism may be arranged to move the welding head over the work or to move the work under the welding head. Such traversing mechanism is diagrammatically indicated in Fig. 3 and similar mechanism may be provided in the arrangements of Figs. 1 and 2. It will also be understood that auxiliary regulating means may be provided for regulating the speed of the electrode feed motor in addition to the regulation secured by connecting the armature of the motor in shunt to the arc. The voltage across the arc is an electrical characteristic of the arc which varies sensitively with the arc length, and I prefer to secure the speed regulation of the feeding mechanism in response to the voltage across the arc, although it will be apparent that my invention does not exclude the application of regulating mechanism responsive to the current through the arc in systems of the type disclosed in the present application, wherein the current through the arc will vary upon changes in the length of the arc where the open circuit voltage of the source is not too high with respect to the arc voltage, as is well known in the art.

Figure 3:
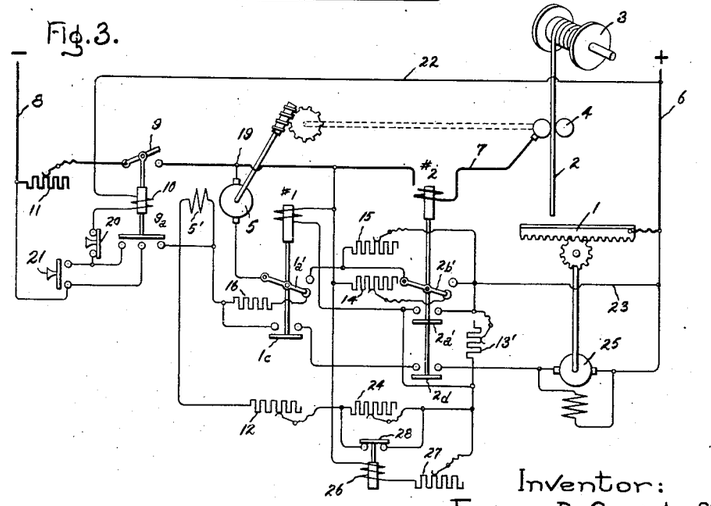
Fig. 3 is a diagram showing a further modification and this figure also indicates diagrammatically means for producing traversing motion of the arc along the joint to be welded, and also indicates the application of a separate regulator for controlling the rate of feed of the welding pencil or electrode, which traversing mechanism and separate regulator are not illustrated in the other figures of the drawings.

Referring to Fig. 3 the contactors #1 and #2 are shown with their contacts arranged and connected somewhat differently from the arrangements shown in Figs. 1 and 2, but the circuit controlling mechanism is arranged to secure the same functional operation. Push buttons are shown for completing the circuit of the operating coil 10 of the switch 9. The push button 20 is normally closed and the push button 21 normally open. When it is desired to weld, push button 21 is closed and the circuit for the coil 10 is completed from the main 6 through the lead 22, coil 10, push button 20 and push button 21 to the main 8. When switch 9 closes, contact 9ª simultaneously closes to complete a shunt around the push button 21 so that the operating coil 10 will remain energized when the operator releases the push button 21. The contact 9ª also completes a circuit from the main 6 through the lead 23, resistor 13′, resistor 24, resistor 12, the field winding 5′ of the motor and contact 9ª to the main 8. The electrodes being separated, contactor #2 remains deenergized. Contactor #1 is energized through the lead 23, resistor 13′, the operating coil of the contactor to the point 19. Contactor #1 therefore picks up and a circuit for operating the motor 5 in a direction to feed the electrode to and into contact with the work is completed through the lead 23, resistor 15, contact 1ª′ to the point 19. The resistor 14 at this time is connected in shunt to the motor armature by means of the contact 2ᵇ′ of contactor #2. When the welding electrode or pencil 2 engages the work, contactor #2 is energized and picks up. Contactor #1 is deenergized and drops out. The dropping out of contactor #1 completes a back or reversing circuit for the electrode feed motor from the point 19 through the armature, contact 1ª′, resistor 16 and contact 9ª to the main 8. The motor, therefore, operates to withdraw the electrode from the work and establish the arc. The closing of contactor #2 closed contact 2ª′ short circuiting resistor 13′, connecting the operating winding of contactor #1 across the electrodes through the lead 23, contact 2ª′ to point 19 which, as heretofore pointed out, is at the same potential as the electrode 2, and when the electrode 2 is in contact with the work point 19 is at substantially the same potential as main 6. When the welding arc is established contactor #1 again picks up and completes a circuit connecting the armature of the motor 5 across the arc through the lead 23, contact 2ᵇ′, contact 1ª′ to the point 19. The motor then operates in a direction to feed the electrode toward the work and maintain the arc length substantially constant as heretofore described.

In the arrangement of Fig. 3 a motor 25 is shown for moving the work under the electrode to traverse the arc along the joint to be welded. The circuit of this motor is completed across the mains 6 and 8 through the contact 2ᵈ of contactor #2 and contact 1ᶜ of contactor #1 so that both of these contactors must be energized to complete the circuit of the traversing motor 25. The traversing motor, therefore starts into operation only when the welding arc has been established and stops whenever contactor #2 opens due to an interruption of the arc or contactor #1 opens due to a short circuit between the electrodes. Suitable braking means will be provided for stopping the motor 25 instantly under either of these conditions but since such braking means forms no part of my invention it need not be specifically described.

In the arrangement of Fig. 3 a vibratory regulator is also shown for increasing the sensitiveness of the speed regulation of the electrode feed motor. The arrangement shown is substantially the same as that shown in the copending application of Paul O. Noble, 323,170, filed September 11, 1919 for methods and apparatus for electric arc welding and assigned to the same assignee as the present application. This regulator comprises a coil 26 connected across the electrodes through the lead 23, resistor 13′, resistor 27, coil 26 to the point 19. When the circuit is open at the electrodes and contactor #2 deenergized, resistor 13 is in circuit with coil 26 so that this coil, which normally functions on arc voltage, is protected from the relatively high open circuit voltage of the source. During welding, resistor 13' is short circuited by contact 2ᵃ' as above described so that coil 26 is connected directly across the electrodes through the resistor 27 which may be provided for adjusting the coil to hold the desired arc voltage. Coil 26 operates contact 28 to vary the effective value of the resistor 24 in accordance with the voltage across the arc. A rise in arc voltage inserts resistor 24 in the circuit of the field winding 5' of the motor, thus weakening the field of the motor and tending to speed the motor up. The resistor is adjusted to such a value that when inserted the motor tends to run too fast so that the arc is shortened, whereupon the weakening of coil 26 short circuits the resistor 24 to strengthen the motor field and slow the motor down. The contact 28 is rapidly vibrated by the coil 26 to secure a sensitive regulation in a manner well known to those skilled in the art of electric regulators. The resistor 12 also in circuit with the field winding 5' permits a manual adjustment of the resistance of the motor field circuit as in the arrangements of Figs. 1 and 2.

The arrangement of Fig. 3 operates to restrike the arc whenever it is interrupted or short circuited as in the arrangement heretofore described. Whenever it is desired to stop welding the push button 20 is operated to open the circuit of coil 10, whereupon the switch 9 opens the welding circuit and contactors #1 and #2 are deenergized and the electrode feed motor 5 and traversing motor 25 stop.

In all of the arrangements heretofore described, it is desirable, when a large change is made in the value of the welding current requiring a large change in the normal speed of the electrode feed motor, to provide a different gear ratio between the motor and the feed rolls, so that the motor may be run more nearly at the speed for which it is designed to give the best regulation. It is also desirable, where a large change in the welding current is made, to change the number of turns on the winding of the series contactor #2 since if the current is changed, for example from 100 to 200 amperes, the operating force of this winding will be changed more than is necessary or desirable.

Figure 4:
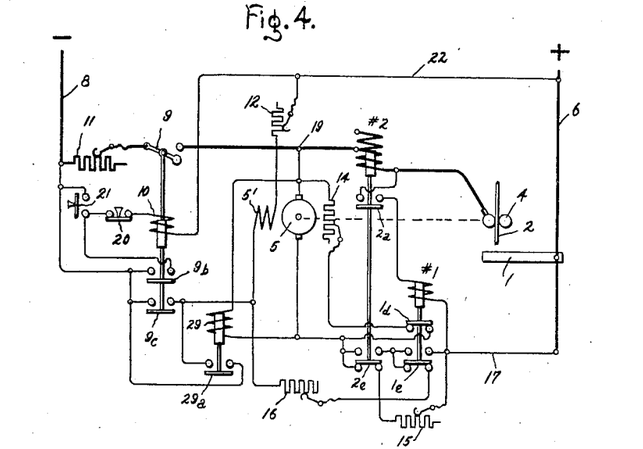
Fig. 4 illustrates a further modification.

In the arrangement shown in Fig. 4, the winding of the contactor #2 is provided with a pair of taps. When welding currents of 100 amperes and below are used, the entire winding may be placed in circuit and when the range of welding current is from 100 to 300 amperes the lower section of the winding alone may be used. A greater number of taps may be provided if desired.

Referring to the arrangement shown in Fig. 4 the push buttons 20 and 21 control the circuit of coil 10 for the switch 9 substantially as in the arrangement of Fig. 3. The shunt and series contactors #1 and #2 are provided with circuit controlling contacts arranged and connected somewhat differently from the arrangements heretofore described but the arrangement is similar to the arrangement shown in Fig. 2 to the extent that both contactors #1 and #2 remain deenergized until the electrode 2 contacts with the work, at which time contactor #2 becomes energized but contactor #1 remains deenergized, as in the arrangement of Fig. 2, until the arc has been established, at which time #1 contactor operates as in the arrangement of Fig. 2. It is believed that the arrangement of Fig. 4 may be most readily understood by describing the operation.

With the arrangement shown in Fig. 4, when the push button 21 is closed, the coil 10 is energized as in the arrangement of Fig. 3 and switch 9 closed. Contact 9ᵇ completes a circuit shunting push button 21 and contact 9ᶜ completes the circuit of the field winding 5' from the main 6 through the lead 22, resistor 12, the field winding and contact 9ᶜ to the main 8. Contactors #1 and #2 being down, a circuit for operating the motor in a direction to feed the welding pencil into contact with the work is completed from the main 6 through the lead 17, resistor 15, contact 2ᵉ, the motor armature to the point 19. The motor operates to feed the pencil into contact with the work and contact 1ᵈ during this operation maintains the resistor 14 in shunt to the armature 5 to give a steady operation as heretofore described. When the pencil engages the work contactor #2 is energized and contact 2ᵃ completes the circuit of the operating coil of contactor #1 but this contactor remains down until the arc is established as in the arrangement of Fig. 2. The motor is dynamically braked by reason of the resistor 14 in shunt with the armature until the back or reversing circuit is completed for the motor. The energization of contactor #2 completes this back or reversing circuit from the point 19 through the armature 5, contact 2ᵉ, contact 1ᵉ, resistor 16 and contact 9ᶜ to the main 8. The resistor 14 is maintained in shunt to the armature 5 during this reversing operation so that the motor operates steadily by reason of the shunt resistor 14 and series resistor 16 in withdrawing the electrode from the work. When the arc is established, contactor #1 operates and the armature of the motor is connected across the arc through lead 17, contact 1ᵉ, contact 2ᵉ, and the armature of the motor to point 19. The motor then operates to feed the electrode toward the work to maintain the arc length substantially constant as heretofore described, the circuit of the shunt resistor 14 being now opened at the contact 1ᵈ.

In the arrangement of Fig. 4, a relay having an operating winding 29 connected in shunt to the motor armature, is provided for controlling a contact 29ᵃ which, when closed shunts the contact 9ᵃ controlled by the coil 10. The purpose of this relay is to prevent coasting of the electrode feed motor which might jam the electrode against the work when the switch 9 is opened. If, for example, the operator pushes the button 20 to deenergize coil 10 and open switch 9, contact 9ᶜ opens but the circuit of the field winding 5' remains completed through the contact 29ᵃ. The field of the motor therefore remains energized so that a strong dynamic braking action is provided to stop the motor. The braking current flows through the resistor 14, the circuit of which is completed through the contact 1ᵈ of contactor #1 which drops out when the switch 9 is opened. The motor is therefore quickly stopped. Its counter-electromotive force disappears when the motor stops and coil 29 is deenergized opening contact 29ᵃ, opening the circuit of field winding 5'. The provision of this relay makes it possible to arrange the contacts operated by the coil 10 so that when this coil is deenergized it not only opens the welding circuit but also opens the field circuit of the motor. It is thus unnecessary to provide a switching means which must be separately operated to open the field circuit of the motor, as is necessary in the arrangement of Fig. 2, for example. I do not claim this relay arrangement for preventing coasting of the electrode feed motor, such arrangement being claimed in the copending application of William B. Clarkson, Serial No. 682,341 filed December 22, 1923, for automatic arc welding control system.

In all of the arrangements heretofore described, the circuit from the source of welding current through the electrodes is completed at the initial engagement of the welding pencil with the work. While the arrangements for dynamically braking the electrode feed motor and completing a circuit for reversing the motor, enable the welding arc to be satisfactorily struck, it is, however, advantageous to complete the circuit for the welding current after the electrodes have been brought into engagement. It will be observed that in all of the arrangements heretofore described, the switch 9 is closed prior to the engagement of the electrodes. The full open circuit voltage of the welding source is therefore present across the electrodes at the moment of their engagement and under certain conditions the electrode tends to freeze to the work so that a very considerable pull is required to wrench it loose to strike the arc. This results from the fact that the initial contact between the end of the electrode and the work is usually made through one or more small projections, the end of the electrode and the surface of the work never being perfectly flat and smooth so that a contact is made over the whole area of welding electrode. The initial rush of current which flows when these points first engage is frequently sufficient to raise these points to a welding temperature almost instantly so that when the electrode butts down against the work a butt weld is made between the electrode and the work.

Figure 5:
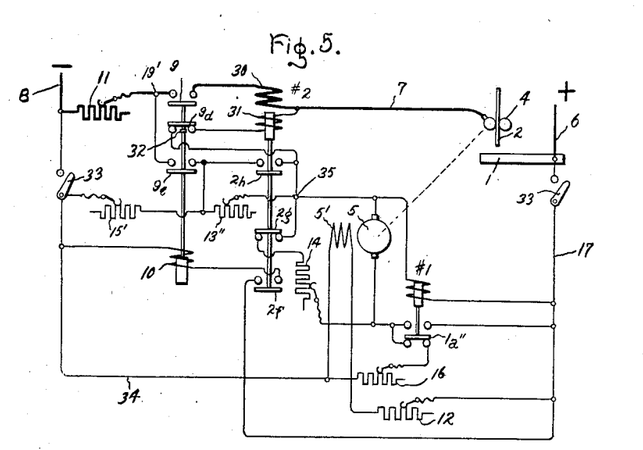
Fig. 5 shows a modification illustrating the application of my improved method of striking the arc.

In the arrangement of Fig. 5 I have arranged circuit controlling mechanism so that the welding circuit is not closed to permit the flow of welding current through the electrodes until after the electrodes engage, although the circuit arrangement is such that the initial contact between the electrodes causes the actuation of the circuit controlling mechanism which produces the desired operation of the electrode feed motor or other arc striking mechanism and also causes the application of welding current through the electrodes. I do not claim broadly the idea of applying welding current after the engagement between the electrodes in an apparatus for arc welding involving automatic means for withdrawing the electrode to strike the arc, since such subject-matter is disclosed and claimed in the application of Max A. Whiting, Serial No. 277,309, filed February 15, 1919, for methods of and apparatus for automatic arc welding, assigned to the same assignee as the present application. My invention, however, provides an advantageous circuit arrangement as well as an advantageous arrangement of the circuit controlling mechanism.

Referring to Fig. 5, it will be observed that the series or #2 contactor is provided with two windings. The winding 30 is in series with switch 9 and the electrodes as in the arrangements heretofore described. The second winding 31 is a low resistance winding in series with the electrodes, the circuit of which is controlled by a contact 9ᵈ on the switch 9 operated by the coil 10. Contactor #2 is provided with a contact 2ᶠ, which controls the circuit of the coil 10; a contact 2ᵍ, which controls the circuit of the resistor 14 in shunt to the motor armature, and a contact 2ʰ which controls a shunt around resistor 13", which corresponds in some respects to the resistor 13 of Fig. 1. Contact 2ʰ also cooperates with contact 9ᵉ to complete a circuit from one terminal of the motor armature to the point 19' which, when the switch 9 is closed, corresponds to the point 19 in the arrangements heretofore described. Contact 9$^d$ of switch 9 is arranged so as not to open before switch 9 is closed. This is indicated in the drawing by a collar 32, spaced away from the contact 9$^d$ when the switch 9 is open. When coil 10 is energized to close switch 9 this collar raises contact 9$^d$ to open the circuit of coil 31 simultaneously with or immediately after switch 9 closes. A double pole switch 33 is shown for completing the circuits preparatory to welding. This switch may be remotely controlled through push buttons, if desired.

The operation of the arrangement shown in Fig. 5 is as follows: Assuming that the electrodes are not in engagement, when the double pole switch 33 is closed a circuit is completed from the main 6, lead 17, the operating coil of contactor #1, resistor 13″, resistor 15′ to the main 8. The circuit of the field winding 5′ of the motor is also closed through lead 17, resistor 12, winding 5′, lead 34 to the main 8. The resistors 13″ and 15′ permit sufficient current to flow through the coil of contactor #1 to cause it to pick up. The picking up of contactor #1 completes a circuit for operating the feed motor in a direction to feed the electrode 2 toward the work. This circuit is from lead 17, through contact 1$^{a″}$, the armature of the motor 5, resistor 13″ and resistor 15′. The resistor 14 is in parallel with the motor armature so that the combination of resistors in series and shunt with the motor armature causes the motor to operate at a slow and steady speed to feed the pencil into contact with the work. It will be observed that one terminal of motor 5 is connected to the work through contact 1$^{a″}$ and the other terminal of the armature is connected to the electrode 2 from point 35 through contact 9$^d$, low resistance coil 31 and lead 7. The operating coil of contactor #1 and the armature of the motor are therefore in shunt across the electrodes but the voltage across the electrode is low compared to the open circuit voltage of the source by reason of the voltage drop occurring in resistors 13″ and 15′. The energizing of contactor #1, which connected the motor armature across the electrodes, also connected the resistor 14 across the electrodes so that the operation of contactor #1 still further reduced the voltage across the electrodes by reason of the additional voltage drop produced in resistors 13″ and 15′ by reason of the current flowing through the motor armature and resistor 14 in parallel. The voltage across the electrodes is, however, sufficient to retain contactor #1 in its energized position. Upon engagement of the electrodes current flows from the main 6 through the electrodes, lead 7, low resistance coil 31, contact 9$^d$ to the point 35. This path is of low resistance and serves as a short circuit around the motor armature to stop the motor very quickly by dynamic braking. This path also serves to short circuit the coil of contactor #1 so that this contactor drops out quickly. The current flowing through the electrodes to point 35 and through resistors 13″ and 15′ at the instant of engagement of the electrodes, is limited to a low value so that there is no tendency to freeze or butt weld the electrodes together. The current being limited to a low value, the voltage drop across the electrodes due to the contact resistance, is also very low after the electrodes have engaged, so the motor armature and the operating coil of contactor #1 remain effectively shunted. Contactor #2 operates very quickly by reason of the current through series coil 31, to close contacts 2$^f$ and 2$^h$ and open contact 2$^g$. Although contact 2$^g$ opens the circuit of resistor 14 in shunt to the armature, the braking circuit for the armature remains completed through the electrodes for whatever small interval was required for contactor #1 to drop out. The closing of contact 2$^f$ completed the circuit of coil 10, quickly closing switch 9. Welding current now flows from the source through the electrodes, coil 30 and switch 9. The closing of switch 9 opened contact 9$^d$, opening the circuit of low resistance coil 31, but contactor #2 is retained in its energized position by reason of the welding current flowing through coil 30 since, as heretofore stated, contact 9$^d$ does not open before switch 9 closes.

The dropping out of contactor #1 completes a circuit for reversing the motor 5 to separate the electrodes and strike the arc. This circuit leads from point 19′ through contact 9$^e$, contact 2$^h$, the motor armature, contact 1$^{a″}$, resistor 16 and lead 34. Some current also flows from point 19′, contact 9$^e$, through resistor 15′, but this current is limited to a low value by the resistor 15′.

Point 19′ is directly connected to point 35 through the contacts 9$^e$ and 2$^h$, the contact 2$^h$ operating to short circuit resistor 13″. The operating coil of contactor #1 is, therefore, connected across the arc through lead 17, the coil, point 35, contact 2$^h$, contact 9$^e$, point 19′, switch 9, coil 30 and lead 7. When the arc reaches a predetermined length, the voltage across the arc energizes contactor #1 and connects the armature of the electrode feed motor across the arc through lead 17, contact 1$^{a″}$ and the armature to point 35, which, as just described, is directly connected to the welding pencil or electrode through a low resistance circuit. The motor now operates to feed the welding electrode toward the work to maintain the arc length substantially constant, as heretofore described.

If the arc is broken, coil 30 of contactor #2 is deenergized and this contactor drops out very quickly opening contact 2ʰ to insert resistor 13″, closing contact 2ᵍ, connecting the resistor 14 in shunt to the armature 5 and opening contact 2ᶠ to deenergize coil 10 and open switch 9. The time required to open switch 9 is short, but during the interval required between the dropping out of contactor #2 and the opening of switch 9 the resistor 13″ protects the motor armature and the coil of contactor #1 from any high voltage which may obtain across the electrodes while the arc is broken and switch 9 closed.

The interruption of the arc thus drops out contactor #2 and opens switch 9, but contactor #1 remains energized through lead 17, the operating coil, resistor 13″ and resistor 15′. The motor, therefore, continues to operate in a direction to feed the welding pencil toward the work and operates at a slow and steady speed with resistor 14 connected in parallel to the motor armature. As soon as the electrodes engage, coil 31 operates contactor #2 which in turn closes switch 9 to close the circuit for the welding current, the electrode feed motor being stopped and reversed as described in connection with the striking of the arc in the first instance.

If during welding the electrodes should engage the work, owing for example to some abrupt variation in the contour of the work, the motor armature and the coil of contactor #1 will be short circuited since one terminal of the motor armature and one terminal of the coil are connected to the work through lead 17, while the other terminals of the motor and coil are connected from point 35 through contacts 2ʰ, 9ᵉ to point 19′ which is connected through the switch 9, low resistance coil 30 and lead 7 to the welding pencil. Contactor #2 remains energized and switch 9 remains closed but contactor #1 drops out and completes a reversing circuit for the motor 5 from point 35 through the armature, contact 1ᵃ″, resistor 16 and lead 34. The motor, therefore, reverses to restrike the arc and as soon as the arc reaches the voltage for which contactor #1 is adjusted, this contactor picks up and again reverses the motor to feed the electrode toward the work to maintain the arc as heretofore described.

While I have described my method of operation and circuit control mechanism in connection with an arrangement in which a reversible electric motor is used to operate electrode feeding mechanism to strike and maintain the arc, it is apparent that in its broader aspects certain features of my invention may be advantageously used where other mechanism is used for controlling the arc striking and arc maintaining electrode feeding mechanism. It will also be obvious to those skilled in the art, from the number of modifications disclosed, that my invention is not limited to the particular arrangements disclosed and I therefore aim in the appended claims to cover all such modifications and variations as are within the true spirit and scope of my invention.

What I claim as new and desire to secure by Letters Patent of the United States, is:—

1. Apparatus for arc welding of the type wherein the welding arc is maintained between the work constituting one electrode and a welding pencil constituting the other electrode, and wherein a reversible electric motor is provided for feeding the pencil toward and away from the work to start the arc and for feeding the pencil toward the work to maintain the arc after the arc is established, and wherein contactors are provided for controlling the circuit of the motor to govern its direction of operation, characterized by the fact that one of said contactors is controlled by a coil responsive to current flowing between the electrodes and another of said contactors is controlled by a coil responsive to the voltage across the electrodes.

2. Apparatus for arc welding of the type wherein the welding arc is maintained between the work constituting one electrode and a welding pencil constituting the other electrode, comprising a reversible electric motor and means operated thereby for feeding the pencil, means for controlling the circuit connections of said motor comprising a winding in series with the electrodes and a winding adapted to respond to the voltage across the electrodes, said circuit controlling means being arranged when the pencil is out of contact with the work and the arc is unestablished, to complete a circuit for operating the motor in a direction to feed the pencil into contact with the work, and arranged upon the energization of said series winding upon the completion of the circuit thereof through the electrodes, to complete a circuit for operating the motor in a direction to withdraw the pencil from the work to establish the arc and arranged upon a predetermined energization of said winding responsive to the voltage across the electrodes when the arc is established, to complete a circuit for operating the motor in a direction to feed the electrode toward the work to maintain the arc.

3. An apparatus for arc welding of the type wherein the arc is maintained between a welding pencil and the work comprising a reversible electric motor and means operated thereby for feeding the pencil, contacts for controlling the motor circuit connections and means for operating said connections and means for operating said contacts comprising a voltage responsive winding and a current responsive winding connected and arranged so that when the arc is unestablished a circuit is completed to operate the motor in a direction to feed the pencil into contact with the work, and so that when the pencil contacts with the work a circuit is completed to reverse the motor to withdraw the pencil from the work to establish the arc, said voltage responsive winding being arranged upon a predetermined arc voltage to establish connections for operating said motor in a direction to feed the pencil toward the work and at a speed varying in accordance with an electrical characteristic of the arc which varies with the arc length.

4. Apparatus for arc welding of the type wherein the welding arc is maintained between the work constituting one electrode and a welding pencil constituting the other electrode, comprising an electric motor for feeding the pencil, circuit controlling means for completing a circuit through the motor to feed the pencil into contact with the work and for connecting the motor in shunt to the arc when the arc is established, resistors adapted to be connected respectively in series and in shunt with the motor armature, windings for controlling said circuit controlling means responsive respectively to the current flowing through the electrodes and the voltage across the electrodes, contacts on said circuit controlling means arranged when the series winding is deenergized and the shunt winding energized above a predetermined value, to complete a circuit through the motor armature and said series resistor with said shunt resistor in parallel with the motor armature to operate the motor in a direction to feed the pencil into contact with the work, and arranged when the series winding is energized and the arc voltage is substantially normal to connect the motor armature across the arc independently of said series resistor and open the circuit through said shunt resistor.

5. Apparatus for arc welding of the type wherein the welding arc is maintained between the work constituting one electrode and a welding pencil constituting the other electrode comprising an electric motor and means operated thereby for feeding the pencil, a circuit for operating said motor to feed the pencil into contact with the work comprising a resistor in shunt with the motor armature and a resistor in series therewith, a circuit for operating said motor to withdraw the electrode from the work, a circuit in shunt to the arc for operating said motor at a speed varying in accordance with changes in arc length to maintain the arc, and means for controlling said circuits comprising a winding in series with the electrodes and a winding responsive to the voltage across the electrodes arranged when the arc is broken to complete said circuit for feeding the pencil into contact with the work, then to complete said circuit for withdrawing the electrode to strike the arc, and upon the establishment of the welding arc to complete said circuit connecting the motor in shunt to the arc.

6. Apparatus for arc welding of the type wherein the welding arc is maintained between the work constituting one electrode and a welding pencil constituting the other electrode, comprising a reversible electric motor and means operated thereby for feeding the pencil toward and from the work, a circuit for operating said motor in a direction to feed the pencil into contact with the work, and means for reversing the motor connections comprising a coil in series with the electrodes for reversing the motor to withdraw the electrode to strike the arc.

7. Apparatus for arc welding of the type wherein the welding arc is maintained between the work constituting one electrode and a welding pencil constituting the other electrode, comprising means for feeding the pencil toward and from the work, means for controlling the direction of operation of said feeding means comprising circuit controlling contacts and a winding in series with the electrodes and a winding in shunt to the electrodes, a resistor in series with said shunt winding, said contacts being arranged when the arc is broken to complete a circuit for operating said feeding means in a direction to move the pencil into contact with the work, a contact controlled by said series winding being arranged to cut out said resistor when the pencil engages the work.

8. Apparatus for arc welding of the type wherein the welding arc is maintained between the work constituting one electrode and a welding pencil constituting the other electrode, comprising a reversible electric motor and means operated thereby for feeding the pencil toward and from the work, a contactor provided with a winding in series with the electrodes, a contactor provided with a winding in shunt to the electrodes, a resistor in series with said shunt winding, said contactors being arranged to complete a circuit for said motor to feed the pencil into contact with the work whenever the arc is interrupted, said series contactor being then deenergized and said shunt contactor energized through said resistor, said contactors being arranged to complete a circuit for reversing the motor to strike the arc after engagement of said electrodes, said series contactor being then energized and said shunt contactor deenergized, means on the series contactor arranged upon the energization thereof to cut out said resistor, thereby connecting the winding of the shunt contactor for sensitive response to the voltage across the electrodes, said contactors being arranged upon the energization of the shunt contactor by a predetermined arc voltage, the series contactor being also then energized, to connect the motor across the arc for operation in a direction to feed the pencil toward the work to maintain the arc.

9. Apparatus for arc welding of the type wherein the welding arc is maintained between the work constituting one electrode and a welding pencil constituting the other electrode and wherein a switch is provided for connecting the electrodes to a source of welding current, and wherein means are provided for feeding the electrode toward and from the work to strike and maintain the arc, characterized by the fact that means are provided for controlling the direction of operation of said feeding means comprising a winding in series with the electrodes and a winding in shunt to the electrodes, and by the further fact that said circuit controlling means is arranged to close said switch upon contact between the pencil and the work.

10. In an arc welding system of the type wherein the welding arc is maintained between the work constituting one electrode and a welding pencil constituting the other electrode and wherein the pencil and work are arranged to be connected to a source of welding current, means for feeding the pencil toward and from the work to start the arc, a switch for controlling the circuit between the source and the electrodes, a contactor for controlling the operation of said switch comprising a winding in series with said switch and the electrodes, a second winding in series with the electrodes for operating said contactor connected to be energized independently of said switch when the electrodes are in engagement, and a resistor in series with said second winding to limit the current through the winding and electrodes to a value low enough to prevent freezing of the pencil to the work when it is moved into contact with the work.

11. In an arc welding system of the type wherein the welding arc is maintained between the work constituting one electrode and a welding pencil constituting the other electrode and wherein the pencil and work are arranged to be connected to a source of welding current, means for feeding the pencil toward and from the work to start the arc, a switch for controlling the circuit between said source and the electrodes, a contactor for controlling said switch provided with a winding in series with the electrodes and arranged to be connected to the source independently of said switch when the electrodes are in engagement, an impedance in series with said winding adapted to limit the current through the winding and electrodes to a value low enough to prevent freezing of the pencil to the work when it is moved into contact therewith, and means in shunt to the electrodes and said winding arranged to provide a path for current to flow through said impedance of a value sufficient to reduce the voltage across the electrodes to a low value compared to the open circuit voltage of the source.

12. In an arc welding system of the type wherein the welding arc is maintained between the work constituting one electrode and a welding pencil constituting the other electrode and wherein a switch is provided for connecting the work and pencil to a source of welding current, an electric motor and means operated thereby for feeding the pencil toward and from the work to strike and maintain the arc, circuit controlling means comprising a winding in series with the electrodes and a winding in shunt to the electrodes for completing, when the arc is unestablished, a circuit for the armature of said motor in shunt to the electrodes, said circuit being completed to the source independently of said switch, a series impedance and an impedance in shunt to the armature whereby the voltage across the electrodes and motor is reduced and the motor operates at a slow and steady speed to feed the pencil into contact with the work and, upon engagement of the electrodes, establish a low resistance circuit across the motor armature to brake the motor dynamically, deenergize the shunt winding and energize the series winding of the circuit controlling means, means whereby the energization of the series winding upon engagement of the electrodes closes said switch to connect the source to the electrodes, said circuit controlling means being arranged upon energization of said series winding and deenergization of said shunt winding to complete a circuit for reversing the motor to withdraw the pencil from the work to strike the arc and being arranged upon energization of said shunt winding by a predetermined arc voltage to connect the motor armature across the arc for operation in a direction to feed the electrode toward the work.

13. Apparatus for arc welding of the type wherein the welding arc is maintained between the work constituting one electrode and a welding pencil constituting the other electrode and wherein means comprising an electric motor are provided for feeding the pencil toward the work preparatory to striking the arc, characterized by the fact that means controlled by the electrical condition of the arc are provided for completing, when the arc is unestablished and the electrodes separated, a circuit for operating said motor in a direction to feed the pencil into contact with the work connected so that upon engagement between the electrodes a low resistance dynamic braking circuit is completed through the electrodes in shunt to the motor armature.

14. The method of striking the arc in an arc welding system of the type wherein the welding arc is maintained between the work constituting one electrode and the welding pencil constituting the other electrode and wherein a switch is provided for connecting the electrodes to a source of welding current, which comprises moving the pencil into contact with the work while maintaining said switch open and while maintaining a circuit of relatively low impedance in shunt to the electrode, impressing an electromotive force across said impedance and the electrodes relatively low compared to the voltage of the supply circuit when the welding current is not flowing, maintaining the current supplied through said electrodes, upon initial contact therebetween, at a relatively low value compared to the normal welding current, closing said switch to apply the welding current immediately after the pencil engages the work and then withdrawing the pencil from the work to strike the arc.

In witness whereof, I have hereunto set my hand this 13th day of December, 1923.

EUGENE R. CARICHOFF.